(12) United States Patent
Janssen et al.

(10) Patent No.: US 10,221,807 B2
(45) Date of Patent: Mar. 5, 2019

(54) PARTICULAR ARRANGEMENT OF A COOLING DUCT CONNECTING BORE OF A COOLING DUCT

(71) Applicant: KS KOLBENSCHMIDT GMBH, Neckarsulm (DE)

(72) Inventors: Michael Albert Janssen, Mosbach (DE); Wolfgang Köhler, Massenbachhausen (DE); Gerhard Luz, Nordheim (DE); Franz Ratzky, Neckarsulm (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 0 days.

(21) Appl. No.: 14/411,401

(22) PCT Filed: Jun. 24, 2013

(86) PCT No.: PCT/EP2013/063141
§ 371 (c)(1),
(2) Date: Dec. 26, 2014

(87) PCT Pub. No.: WO2014/001256
PCT Pub. Date: Jan. 3, 2014

(65) Prior Publication Data
US 2015/0159584 A1  Jun. 11, 2015

(30) Foreign Application Priority Data

Jun. 27, 2012 (DE) .................. 10 2012 211 037
Oct. 18, 2012 (DE) .................. 10 2012 218 963

(51) Int. Cl.
*F02F 3/16* (2006.01)
*F02F 3/22* (2006.01)
(Continued)

(52) U.S. Cl.
CPC .............. *F02F 3/22* (2013.01); *F02F 3/0015* (2013.01); *B23P 15/10* (2013.01); *F02F 3/16* (2013.01);
(Continued)

(58) Field of Classification Search
CPC . B23P 15/10; F02F 3/0015; F02F 3/16; F02F 3/20; F02F 3/24; F02F 3/28; F02F 3/22; F02F 2003/0061
(Continued)

(56) References Cited

U.S. PATENT DOCUMENTS

| 3,613,521 A | * | 10/1971 | Itano | .................... | F02F 3/003 |
| | | | | | 123/41.35 |
| 2010/0108017 A1 | * | 5/2010 | Bing | .................... | B23K 13/02 |
| | | | | | 123/193.6 |

(Continued)

FOREIGN PATENT DOCUMENTS

| DE | 7335155 U | 12/1974 |
| DE | 102006002949 A1 | 8/2007 |

(Continued)

*Primary Examiner* — Christopher J Besler
(74) *Attorney, Agent, or Firm* — Young Basile Hanlon & MacFarlane, P.C.

(57) ABSTRACT

The arrangement relates to a method for producing a cooling duct piston for an internal combustion engine, having the steps of producing a top piston part by introducing a combustion bowl, a cooling space of a part of a cooling duct and overflow ducts, producing a bottom piston part by introducing a part of a cooling duct, and joining the piston parts, wherein at least one transfer duct is created by bores. A cooling duct piston produced by the method is disclosed.

10 Claims, 1 Drawing Sheet

(51) Int. Cl.
*F02F 3/28* (2006.01)
*B23P 15/10* (2006.01)
*F02F 3/00* (2006.01)

(52) U.S. Cl.
CPC ......... *F02F 3/28* (2013.01); *F02F 2003/0061* (2013.01); *Y10T 29/49274* (2015.01)

(58) Field of Classification Search
USPC .......................................... 123/196.3, 41.35
See application file for complete search history.

(56) References Cited

U.S. PATENT DOCUMENTS

| | | | |
|---|---|---|---|
| 2011/0119914 A1* | 5/2011 | Janssen | B23K 20/12 |
| | | | 29/888.04 |
| 2011/0192023 A1* | 8/2011 | Seifried | B21J 5/002 |
| | | | 29/888.045 |
| 2013/0032104 A1* | 2/2013 | Andreas | B22C 9/105 |
| | | | 123/41.35 |
| 2013/0047948 A1* | 2/2013 | Heuschmann | F02F 3/22 |
| | | | 123/193.6 |

FOREIGN PATENT DOCUMENTS

| | | | | |
|---|---|---|---|---|
| DE | 102007018932 A1 | 10/2008 | | |
| DE | 102008011922 A1 | 9/2009 | | |
| DE | 102010015568 A1 | 10/2011 | | |
| WO | WO-2011131266 A1 * | 10/2011 | ............. | B22C 9/105 |

* cited by examiner

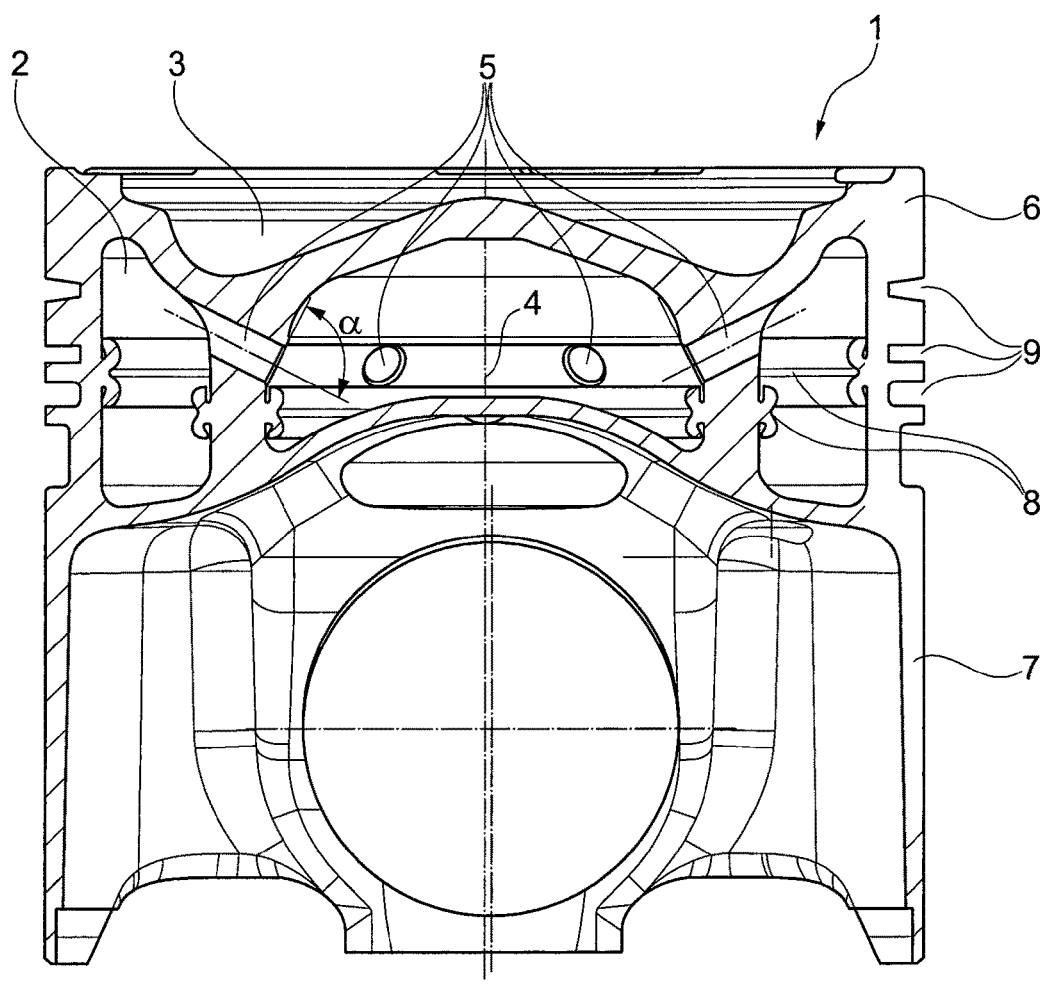

PARTICULAR ARRANGEMENT OF A COOLING DUCT CONNECTING BORE OF A COOLING DUCT

BACKGROUND

The arrangement relates to a method for producing a cooling duct piston and to a cooling duct piston for an internal combustion engine.

Cooling duct pistons for internal combustion engines are known in principle in the prior art. Such pistons have a peripheral cooling duct located radially behind the ring belt in which a medium, such as engine oil, circulates. This cooling medium is introduced, for example, injected, into the cooling duct through at least one inlet opening, The cooling medium then circulates in the cooling duct to dissipate the heat in the piston crown and exits again through at least one outlet opening. An additional cooling space is located inside the cooling duct around the piston axis, often below the combustion bowl. A cooling duct piston of this type is known, for example, from DE 10 2007 018 932 A1.

In the case of this known cooling duct piston, a piston upper part and a piston lower part are initially produced so that these two parts can be produced, i.e. formed, optimally with respect to their design characteristics and also from the aspect of process operations. Following production of the two parts, the two parts are joined, for example, using friction welding.

It is known in the prior art that the cooling duct piston from DE 10 2007 018 932 A1 has an outer, peripheral annular cooling duct and, approximately below a combustion bowl, a dome-shaped cooling space. Using this design, it is possible, for example, for a cooling medium to be injected from an injection nozzle through an inlet opening into the outer annular radial cooling duct, where it circulates and reaches the internal cooling space through at least one, or several, overflow passages. From there, the cooling medium can leave the central cooling space through a central bore through which the piston stroke axis runs to dissipate the heat in the piston crown (i.e., the area behind the ring belt). Naturally, it is also possible for the flow to circulate in the opposite direction.

It is necessary to introduce the at least one overflow bore starting from the inner cooling space in the direction of the outer cooling duct before the two parts are produced. To do this, it is necessary to design the contour of the inner cooling duct (or cooling space) with a constant wall thickness towards the combustion bowl. Thus, it was possible to introduce these bores at any angle to the axis of the overflow bore by first countersinking the material at the point where the bore is to be introduced using a cutting bit and then boring the overflow bore after changing tools. This production step is costly, however, because two tools have to be used so that two successive production steps and/or a tool change are/is required, which is disadvantageous in the series production of such cooling duct pistons. Countersinking the material in the area in which the overflow bore is to be introduced is necessary because, in the prior art (FIG. 2 from DE 10 2007 018 932 A1), the axis of the overflow bore is not aligned at a right angle to the corresponding wall of the cooling space.

It would be desirable to improve a production method for overflow bores in cooling duct pistons, in particular, with respect to reduced production costs.

SUMMARY

In accordance with the present arrangement, provision is made for the contour of the inner surface of the internal cooling duct, or cooling space, to be shaped such that in cross-section the inlet angle of the overflow opening or duct measures between 85° and 95°, or between 87° and 93°, or further between 89° and 91°, or finally exactly 90°. In this way, deviation of the cutting bit for introducing the overflow bore is prevented and, further, the previous requisite step of countersinking can be dispensed with. Consequently, the process steps and the process time are reduced, resulting in lower production costs.

DETAILED DESCRIPTION

In what follows, an example of the arrangement is explained in greater detail using the drawing FIGURE which shows a sectioned view of a cooling duct piston having overflow bores in accordance with the present arrangement.

In the following description of the FIGURE, terms such as up, down, left, right, front, rear, etc., refer solely to the example shown in the FIGURE and position of the device and other parts These terms are not to be understood in a restrictive sense, i.e., these references can change as the result of different operating positions and/or mirror-image design.

The FIGURE shows a sectioned view of a cooling duct piston 1 produced in accordance with the present method. The cooling duct piston 1 has a radially peripheral cooling duct 2. A cooling space 4 is located below the combustion bowl 3 that can be filled with a cooling medium, usually engine oil. Overflow or transfer ducts 5 are provided between the cooling duct 2 and the cooling space 4, designed as bores, for example. The cooling medium can reach the open space from the cooling duct 2 through these overflow ducts, and vice versa. The cooling duct piston 1 is joined together from a piston upper part 6 and a piston lower part 7. A seam 8 forms the contact point between the piston upper part 6 and the piston lowerpart 7. The cooling duct piston 1 has ring grooves 9 on its circumference to receive piston rings, not shown.

The contour of the inner surface of the internal cooling duct 2, or cooling space 4 is shaped such that in cross-section the inlet angle $\alpha$ of the transfer duct 5 measures between 85° and 95°, or between 87° and 93°, or further between 89° and 91°, or exactly 90°.

What is claimed:

1. A method for producing a cooling duct piston for an internal combustion engine comprising the steps:
   producing a piston upper part while introducing a combustion bowl, one part of a cooling space, one part of a cooling duct, and at least one transfer duct having a diameter positioned solely in the piston upper part and positioned angularly offset between a horizontal and a vertical orientation;
   producing a piston lower part while introducing a second part of the cooling duct and a second part of the cooling space;
   joining the piston upper and lower parts along a first seam and a second seam, the first and the second seams oriented horizontally; and
   characterized in that:
   the at least one transfer duct between the cooling duct and the cooling space is created by boring at the angularly offset orientation relative to the horizontal first and second seam; and
   forming a planar inner surface portion of the cooling duct or the cooling space having a width at least as large as the at least one transfer duct diameter, is shaped such that, in cross-section, an inlet angle $\alpha$ from a longitudinal axis of the at least one transfer duct to the inner surface of the cooling duct or the cooling space, measures between 85° and 95° thereby preventing deviation of a cutting bit positioned along the longitudinal axis operable for the boring of the at least one transfer duct without using countersinking.

2. The method of claim 1 wherein the inlet angle α of the at least one transfer duct measures between 87° and 93°.

3. The method of claim 1 wherein the inlet angle α of the at least one transfer duct measures between 89° and 91°.

4. The method of claim 1 wherein the inlet angle α of the at least one transfer duct measures 90°.

5. The method of claim 1 wherein boring of the at least one transfer duct occurs while the piston upper part is separate and independent of the piston lower part.

6. A method for producing a cooling duct piston for an internal combustion engine comprising the steps:
producing a separate and independent piston upper part including a combustion bowl, a first portion of a cooling space and a first portion of a cooling duct;
defining a longitudinal axis of a transfer duct to fluidly communicate between the cooling space first portion and the cooling duct first portion, the transfer duct longitudinal axis angularly oriented between the horizontal and vertical;
forming a planar surface portion on at least one of an inner surface of the cooling space or the cooling duct intersecting the transfer duct longitudinal axis, the planar surface portion oriented at an inlet angle α between 85° and 95° from the transfer duct longitudinal axis;
boring a transfer duct through the planar surface portion along the transfer duct longitudinal axis, the bored transfer duct positioned solely and within the piston upper part and without use of a countersink in the at least one of the inner surface of the cooling space or the cooling duct;
producing a piston lower part separately and independent of the piston upper part, the piston lower part including a second portion of the cooling space and a second portion of the cooling duct; and
joining the piston upper and lower parts along a horizontally oriented seam, the transfer duct longitudinal axis oriented at an angular offset from the horizontal seam.

7. The method of 6 wherein the planer surface portion is formed on an inner surface of the cooling space and the boring of the transfer duct begins at the planar surface portion extending radially and angularly outward along the transfer duct longitudinal axis and ending at the cooling duct.

8. The method of claim 6 wherein the inlet angle α is between 87° and 93°.

9. The method of claim 6 wherein the inlet angle α measures between 89° and 91°.

10. The method of claim 6 wherein the inlet angle α is 90°.

* * * * *